United States Patent [19]

Saito et al.

[11] 3,974,357
[45] Aug. 10, 1976

[54] PROCESS AND APPARATUS FOR ELECTRICAL DISCHARGE SHAPING USING SEQUENTIAL SWITCHING

[75] Inventors: Nagao Saito, Nagoya; Kazuhiko Kobayashi, Seto; Toshiro Oizumi, Nagoya, all of Japan

[73] Assignee: Mitsubishi Denki Kabushiki Kaisha, Tokyo, Japan

[22] Filed: Feb. 28, 1974

[21] Appl. No.: 446,727

[30] Foreign Application Priority Data

Mar. 22, 1973 Japan.............................. 48-32882
Mar. 22, 1973 Japan.............................. 48-32882
May 9, 1973 Japan.............................. 48-51426
May 9, 1973 Japan.............................. 48-51427
Aug. 24, 1973 Japan.............................. 48-94954

[52] U.S. Cl. ........................ 219/69 M; 719/69 C; 719/69 P
[51] Int. Cl.² .......................................... B23P 1/08
[58] Field of Search............. 219/69 C, 69 P, 69 M; 315/224, 225; 307/24, 31

[56] References Cited
UNITED STATES PATENTS

| | | | |
|---|---|---|---|
| 2,796,509 | 6/1957 | Blake................................. | 219/69 P |
| 3,098,149 | 7/1963 | Iuoue................................ | 219/69 C |
| 3,257,583 | 6/1966 | Pfau .................................. | 219/69 P X |
| 3,264,517 | 8/1966 | Ullman et al...................... | 219/69 P |
| 3,705,287 | 12/1972 | Saito et al. ........................ | 219/69 C |
| 3,769,483 | 10/1973 | Bell et al............................ | 219/69 C |
| 3,892,936 | 7/1975 | Kobayashi et al............. | 219/69˙C X |

*Primary Examiner*—Bruce A. Reynolds
*Attorney, Agent, or Firm*—Oblon, Fisher, Spivak, McClelland & Maier

[57] ABSTRACT

A process and apparatus for the electrical discharge shaping of a workpiece to a shape corresponding to an electrode shape by sequentially applying an intermittent pulse voltage across the working gap between the workpiece and the electrode and wherein a pulse current having a special slant line waveform, e.g. a triangular waveform, which is different from a rectangular waveform is passed across the working gap from the initiation of discharge so as to minimize the electrode consumption ratio.

7 Claims, 34 Drawing Figures

PROCESS AND APPARATUS FOR ELECTRICAL DISCHARGE SHAPING USING SEQUENTIAL SWITCHING

BACKGROUND OF THE INVENTION

1. Field of the Invention

This invention generally relates to an improved process and apparatus for electrical discharge shaping a workpiece by using switching elements to pass a pulse current having a special slant line waveform which is different from a rectangular waveform across the working gap from the initiation of the discharge so as to perform in an optimum condition.

2. Description of the Prior Art

In processes for the electrical discharge shaping of a workpiece, the state of the working gap was naturally variable, and often resulted in an abnormal discharge across the working gap which would thereby damage the workpiece and the electrode, if the electrical condition, such as the mean value of the discharge current, was left uncontrolled. The operator therefore had to adjust the electrical condition depending upon the state of the working gap. However, it was found to be difficult to adjust the mean value of the discharge current and the operator had to have considerable experience and skill in finding an optimum electirical condition. In an attempt to solve these problems the following prior art was developed.

Figure 1:
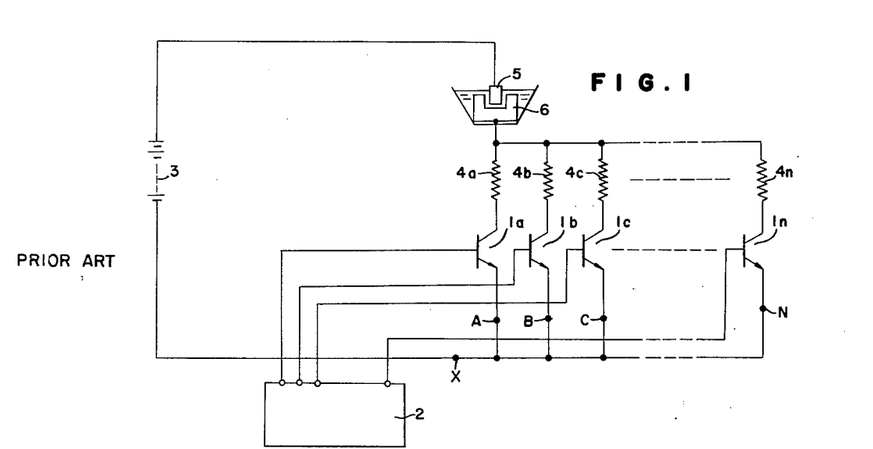
FIG. 1 is a schematic diagram of a prior art apparatus for electrical discharge shaping a workpiece by applying a controlled discharge pulse current waveform across a working gap by using a plurality of transistors.

FIG. 1 is a schematic diagram of a conventional prior art apparatus for shaping a workpiece by electrical discharge. In FIG. 1, a base current is passed to each base of switching transistors $1a$, $1b$, $1c$, ..., $1n$, thereby turning on each of the switching transistors so that the discharge current is passed across the working gap between an electrode 5 and a workpiece 6. The discharge current is provided by a DC power source 3 through the switching transistors $1a$, $1b$, $1c$, ..., $1n$ and collector resistors $4a$, $4b$, $4c$, ..., $4n$ of the switching transistors.

Figures 2A, 2B:
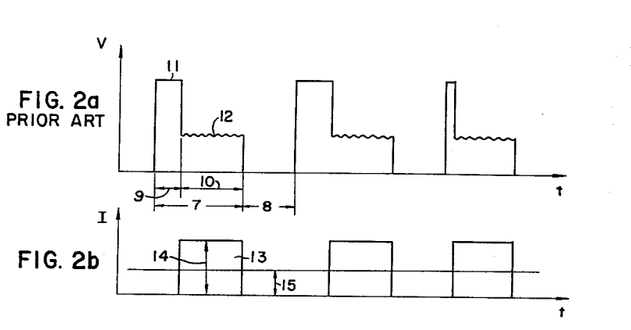
FIG. 2 is an electrode voltage waveform and a current waveform of the prior art.
Figure 3:
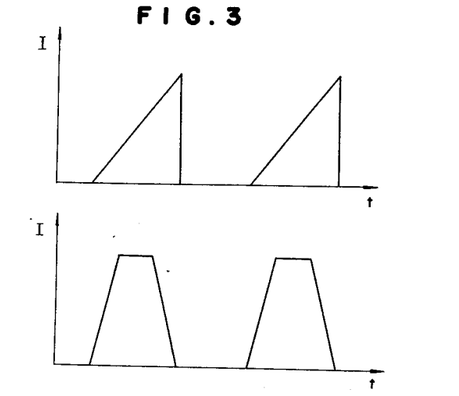
FIGS. 3a, 3b are waveforms of pulses in a practical operation of the invention, which are a triangular current waveform and a trapezoid current waveform.

FIGS. 2a and 2b show voltage and current waveforms appearing across the working gap of the apparatus in FIG. 1. In FIGS. 2a and 2b, a reference numeral 7 designates a pulse width; 8 a quiescent time interval; 9 a non-load voltage time interval; 10 a discharge time interval; 11 a non-load voltage; 12 a discharge voltage; 13 a discharge current; 14 a discharge current peak value; and 15 a mean processing current. Under stable processing conditions, the non-load voltage 11 appears with a high probability, and its mean time interval 9 is controlled to be constant by a servo mechanism capable of maintaining constant the mean processing voltage across the working gap. However, this control is stable only when the state of the working gap is good. In other words, if the state of the working gap has deteriorated due to, for example, a deposit of powders between the working gap, then the non-load voltage time interval diminishes or even vanishes. As a result thereof, it is very likely that the discharge will be concentrated at a specific point, and thus will produce a hollow portion on the workpiece. Under such conditions, the mean processing current will increase as compared to that of FIGS. 2(b). If this condition continues for a certain time interval, extinction of ions across the working gap will not properly occur, and the discharge concentrated at one point on the workpiece will continue and the state of the working gap will be further impaired. To solve this problem, the state of the working gap must be restored by decreasing the mean current.

One prior art method of decreasing the mean current was to detect the state of the working gap in terms of discharge current mean value and to change the oscillation frequency according to the detected value. Although this method imparted quick response to the varying state of the working gap, it had the disadvantage of causing high consumption of the electrode by shortening the discharge period.

The pulse width and the peak value of the discharge current have a close relationship with the processing characteristics and affect the roughness of the processed surface and consumption of the electrode. On the other hand, recently, certain improvements to the processing characteristics have been obtained by passing a pulse current having a special waveform which is different from a rectangular waveform, (e.g., a triangular waveform or a trapezoid waveform). This has been disclosed in the Journal of Denki Kako Gakukai Vol. 3 "Effect of Waveforms in Electrical Discharge Shaping" (First report) by Karafuji, Kinoshita and Fukui wherein it was shown that when the electrical discharge shaping is performed by using a waveform having a slant lift-up line, such as a triangular waveform, the consumption rate of the electrode affected greatly. The circuit of FIG. 1 can be adapted to provide a pulse current having a triangle waveform by including condensers which are inserted in parallel between the collector-emitter of the transistors and reactors which are inserted in series between the power source and the electrode, so as to change the lift-up or lift-down of the rectangular waveform pulse current. However, while somewhat satisfactory, the conventional process utilizes the application of R-C and L-R circuits, which is disadvantageous in that many condensers and reactors are rquired for changing the lift-up or the lift-down in the broad range. Moreover, it is usually hard to form a special waveform having a slant line which is diffierent from triangular or trapezoid waveforms in such an arrangement. In addition, the insertion of a reactor in a circuit is disadvantageous and can cause a spark voltage which in turn could break a trransistor from the viewpoint of the circuit.

SUMMARY OF THE INVENTION

Accordingly, it is an object of this invention to provide a new and improved unique process and apparatus for electrical discharge shaping a workpiece by sequentially applying an intermittent pulse voltage having a quiescent time interval across a working gap between the workpiece and the electrode wherein the pulse current thereof has a special waveform, e.g., triangular waveform, which is different from a rectangular waveform whereby consumption of the working electrode is minimized with the use of a simple structure.

Another object of this invention is to provide a new and improved unique process and apparatus for electrical discharge shaping a workpiece by controlling a lift-up characteristic of the discharge pulse current depending upon a peak value of the pulse current to thereby minimize consumption of an electrode.

A still further object of the invention is to provide a new and improved unique process and apparatus for electrical discharge shaping a workpiece by controlling a pulse current having a special waveform which has a slant line when a time interval from an application of the pulse voltage across the working gap to an initiation of the discharge is shorter than a predetermined time, whereby a mean processing current is decreased and stable operation is performed.

Yet one other object of this invention is to provide a new and improved unique process and apparatus for electrical discharge shaping a workpiece by intermittently passing a pulse current across the working gap wherein a plurality of current waveforms are memorized as a program in a memorizing device and an optimum current waveform is selected from the memorizing device depending upon the time interval from an application of the pulse voltage across the working gap to an initiation of the discharge whereby a stable processing is performed by passing the optimum current waveform across the working gap.

Briefly, the foregoing and other objects are in one aspect obtained in accordance with this invention by the provision of a process and apparatus therefor for the electrical discharge shaping a workpiece which includes a plurality of switching elements for controlling a pulse voltage applied from a power source across a working gap between the workpiece and an electrode; and control means for sequentially switching the switching elements so as to pass a discharge pulse current having a waveform which is different from a rectangular waveform. Means are provided for detecting a state of the working gap by detecting a non-load voltage time interval from an application of the pulse voltage across the working gap to an initiation of the discharge; and a reference circuit is provided for controlling a control means by a reference signal that is provided by comparing the non-load voltage time interval detected by the detecting means to a predetermined time.

BRIEF DESCRIPTION OF THE DRAWINGS

A more complete appreciation of the invention and many of the attendant advantages thereof will be readily apparent as the same becomes better understood by reference to the following detailed description when considered in connection with the accompanying drawings wherein:

FIGS. 9 (1–4) are graphs showing the principle of operation of the controlling device of FIG. 8;

DETAILED DESCRIPTION OF THE PREFERRED EMBODIMENTS

Figure 4:
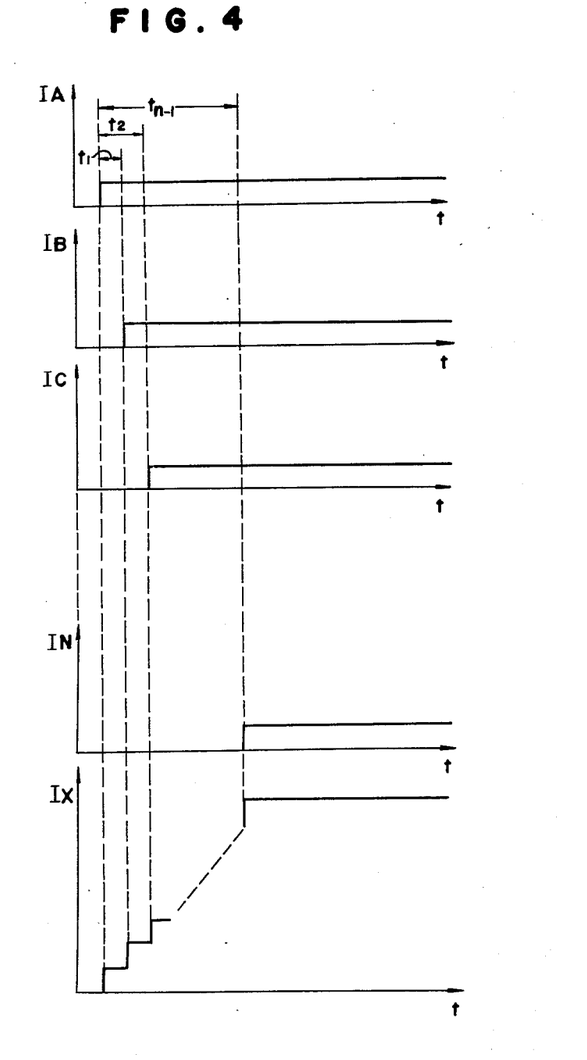
FIG. 4 is a graph showing the principle for forming a special current waveform in accordance with the invention.
Figure 5A:
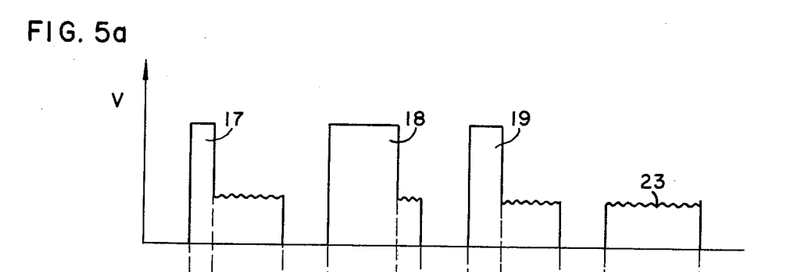
FIGS. 5a, 5b are an electrode voltage waveform and a current waveform which are not preferable as the discharge current waveform in the invention.
Figure 5B:
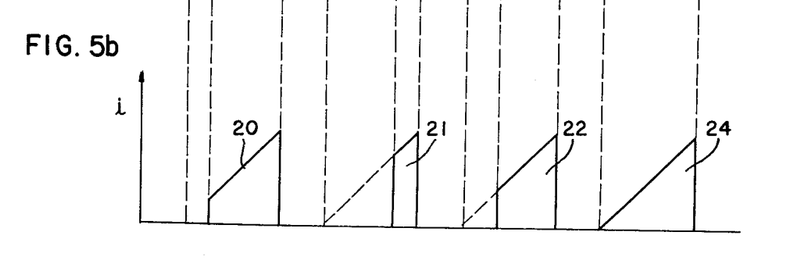

Referring now to the drawings wherein like reference numerals refer to identical or corresponding parts throughout the several views and more particularly to FIG. 4 thereof which shows a graph for understanding the principle of this invention. When the transistor $1a$ of FIG. 1 is turned on, the current at the point A is IA in FIG. 4. When the transistors $1b$, $1c$, ..., $1n$ of FIG. 1 are turned on after $t1$, $t2$, ..., $t_{n-1}$ from the time of turning on of the transistor $1a$, the currents are IB — IN at the point B, C, ..., N as shown in FIG. 4.

$$IX = IA + IB + IC \ldots + In$$

wherein IX designates the current passed at the point X and IA, IB, IC, ..., IN designate the currents passed at the points A, B, C, ..., N. Accordingly, the current waveform at the point X is IX in FIG. 4. The mode of the lift-up of the current can be changed in a broad range by desirably selecting the time interval $t1$, $t2$, ..., $t_{n-1}$ from the turn-on of the transistor $1a$ to the turn-on of the transistors $1b$, $1c$, ..., $1n$. In the same consideration, the mode of the lift-down of current can be changed in a broad range by sequentially turning off the transistors $1a$, $1b$, $1c$, ..., $1n$ which are already turned on. By turning on the transistors $1a$, $1b$, $1c$, ..., $1n$ sequentially, a pulse current having a special waveform is formed and the pulse current having a special waveform is passed from the DC power source 3 through the switching transistors $1a$, $1b$, $1c$, ..., $1n$ and the collectors $4a$, $4b$, $4c$, ..., $4n$ across the working gap between the electrode 5 and the workpiece 6. However, in accordance with an experiment, a certain time interval was found from the turn-on of the switching transistors 1a, 1b, 1c, . . . , 1n to the initiation of the discharge. The electrode voltage waveform, and the discharge current waveform can be shown as FIGS. 5a, b when a triangular pulse current is passed. In FIGS. 5a, b, the reference numerals 17, 18, 19 are electrode voltage waveforms when the discharge is given after the time interval from the turn-on of the switching transistors 1a, 1b, 1c, . . . , 1n; the reference numerals 20, 21, 22 designate discharge current waveforms and 23 designates the electrode voltage waveform when the discharge is given at the same time as the turning on of the switching transistors 1a, 1b, 1c, . . . , 1n; 24 designates the discharge current waveform thereof. As is clear from the description, even though the switching transistors are set so as to work by the pulse current having a triangular waveform, the practical discharge current waveform in the processing is a trapezoid waveform. Accordingly, the improvement of the characteristics of the electrical discharge shaping is not enough and the consumption of the electrode is still disadvantageously high.

Figure 6:
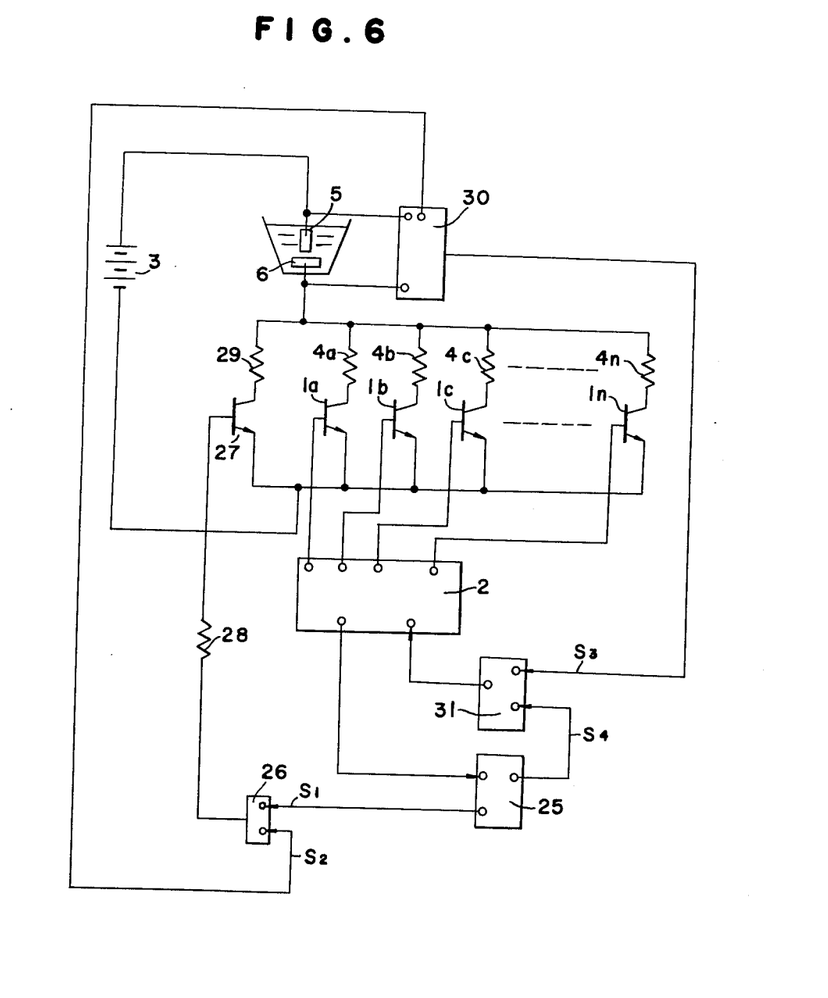
FIG. 6 is a schematic diagram of one preferred embodiment of the apparatus for electrical discharge shaping a workpiece according to the present invention.

FIG. 6 is a schematic diagram of one preferred embodiment of the invention, wherein the reference numeral 25 designates a quiescent time setting circuit; 26 designates a flip-flop circuit; 27 designates a switching transistor for applying voltage across the working gap; 28, 29 designate a base resistor and a collector resistor of said transistors; 30 designates a discharge detector; and 31 designates a clockpulse circuit.

The operation of the embodiment of FIG. 6 is explained as follows. When a signal indicating a finish of the quiescent time is transmitted from the quiescent time setting circuit 25, the signal is passed through a signal line S1 to the flip-flop circuit 26 and the switching transistor 27 is turned on by passing through the base resistor 28 thereof, whereby a voltage is applied across the working gap between the electrode 5 and the workpiece 6, and the discharge is initiated after a certain delay time. The initiation of the discharge is detected by the discharge detector 30, and an impulse signal is transmitted through a signal line S2 to the flip-flop 26 to break the switching transistor 27. On the other hand, at the initiation of the discharge, the clockpulse circuit 31 is activated by passing from the detector 30 through the signal line S3, and the signal is transmitted to a control circuit 2 and the switching transistors 1a, 1b, 1c, . . . , 1n are sequentially turned on as preliminary set. When the switching transistors 1a, 1b, 1c, . . . , 1n are turned on, the pulse current having the special waveform is passed from the DC power source 3 through the switching transistors 1a, 1b, 1c, . . . , 1n and the collector resistors 4*1*, 4b, 4c, . . . , 4n across the working gap.

Figure 7A:
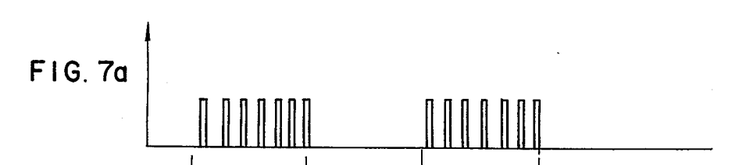
FIGS. 7a, 7b, 7c, 7d, 7e, 7f are graphs showing the principle of operation of the apparatus of FIG. 6.
Figure 7B:
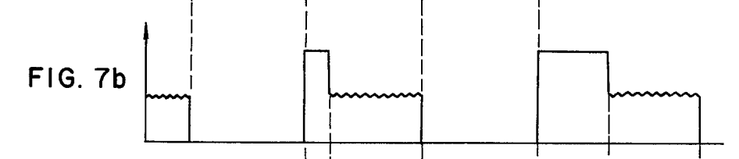
Figure 7C:
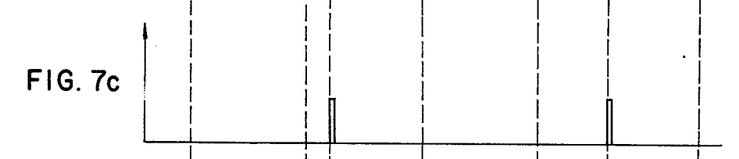
Figure 7D:
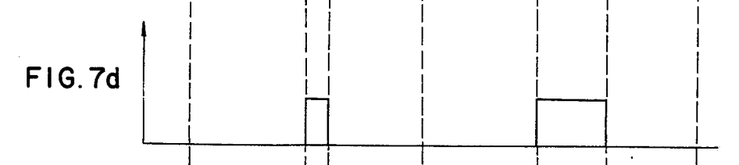
Figure 7E:
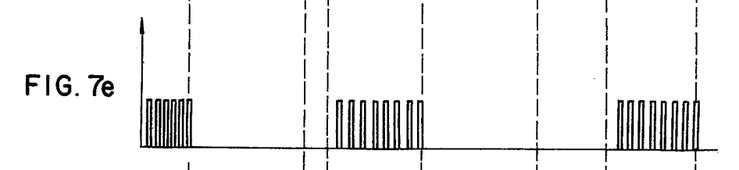
Figure 7F:
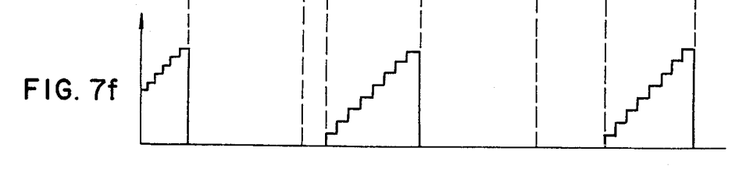

The principle of operation of the embodiment of FIG. 6 is illustrated referring to FIGS. 7a–7f wherein FIG. 7a shows a quiescent time clockpulse; FIG. 7b shows an electrode voltage waveform; FIG. 7c shows a discharge detecting impulse signal; FIG. 7d shows the turn-on time of the switching transistor 27; FIG. 7e shows a discharge time clockpulse; and FIG. 7f shows a discharge current waveform. When the quiescent time clockpulse shown in FIG. 7a reaches to a predetermined value, the switching transistor 27 is turned on as shown in FIG. 7d, and the discharge is initiated across the working gap after the delay time as shown in FIG. 7b. By the time of discharge, the impulse signal of FIG. 7b is transmitted to actuate the clockpulse circuit 31 of FIG. 6 whereby the clockpulse of FIG. 7c is initiated. The switching transistor 27 is turned off by the initiation of the clockpulse as shown in FIG. 7d. When the clockpulse of FIG. 7e is initiated, the turn-on time of the switching transistors 1a, 1b, 1c, . . . , 1n are sequentially delayed depending upon a predetermined number whereby the discharge current waveform of FIG. 7f is passed across the working gap.

Figure 8:
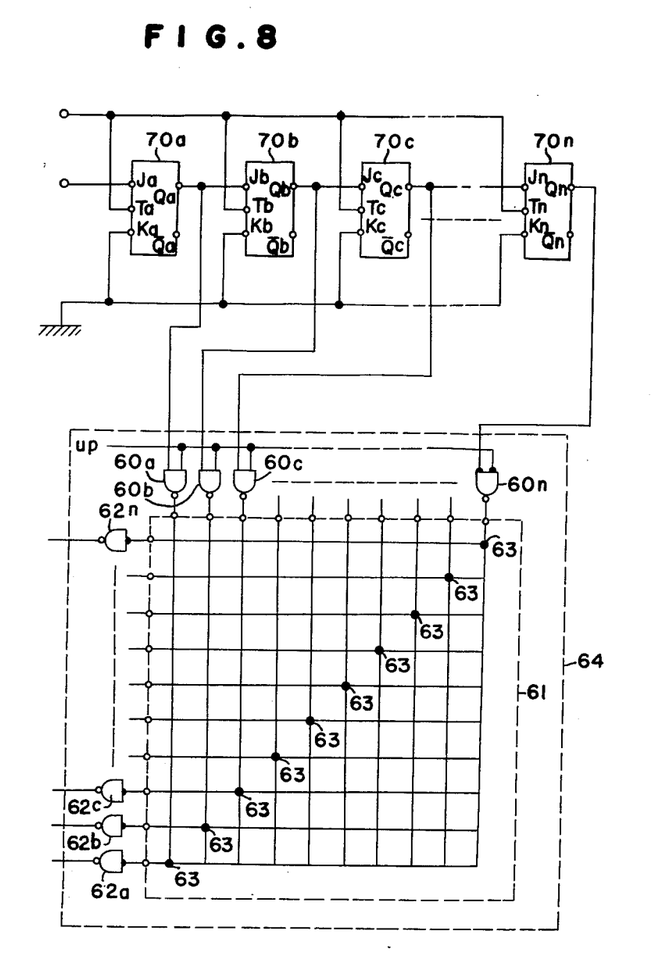
FIG. 8 is a schematic diagram of a program board for forming various waveforms and one embodiment of a controlling device used in the apparatus of FIG. 6.

FIG. 8 is a schematic diagram of the control circuit 2 of FIG. 6 which is used to initiate the pulse current having the desired specific waveform by turning on or turning off the transistors 1a, 1b, 1c, . . . , 1n with certain time intervals. In FIG. 8, the reference numerals 70a, 70b, 70c, . . . , 70n designate JK flip-flops; and Ja, Jb, Jc, . . . , Jn and Ka, Kb, Kc, . . . , Kn respectively designate input terminals of the JK flip-flops. Ta, Tb, Tc, . . . , Tn designate input terminals for the clockpulse CP. The input terminals KA, KB, KC, . . . , Kn designate output terminals of the JK flip-flops and are respectively connected to NAND elements 60a, 60b, 60c, . . . , 60n and also connected to the adjacent input terminals Jb, Jc, . . . , Jn. The NAND elements 60a, 60b, 60c, . . . , 60n are connected to the X-axis terminal of a program board 61 and the input of the NAND elements 62a, 62b, 62c, . . . , 62n are connected to the Y-axis terminal. When an insert pin 63 is inserted in one hole on the program board 61, the input terminal of the NAND elements 62a, 62b, 62c, . . . , 62n are connected to one of the NAND elements 60a, 60b, 60c, . . . , 60n. The selection can be easily given by the insertion of the insert pin 63.

The principle of the operation of the circuit of FIG. 8 is explained as follows. Firstly, the output terminals Qa, Qb, Qc, . . . , Qn are set to 0, and the input terminal Ja is set to 1. In this condition, when one pulse from the clockpulse CP is applied to the input terminals Ta, Tb, Tc, . . . , Tn, there will be provided $Qa = 1$, $Qb = 0$, $Qc = 0, . . . , Qn = 0$ as shown in FIGS. 9 (9-2) – (9-4). The output Qa is then passed through the NAND element 60a, the insert pin 63 on the program board 61 and the NAND element 62a to the base of the transistor 1a, whereby the transistor 1a is turned on. In this case, the output terminal Qa is connected to the input terminal Jb as stated, whereby the input terminal Jb is 1. When another pulse from the clockpulse CP is applied, there will be provided $Qa = 1$, $Qb = 1$, $Qc = 0, . . . , Qn = 0$ whereby the transistor 1b is turned on, in a like manner to the above case. Thus, the transistors 1c, . . . , 1n are sequentially turned on. On the other hand, in order to sequentially turn off the transistors, there is provided Ja 32 $Jb = Jc . . . = Jn = 0$, and Ka is connected to $\overline{Qb}$; Kb is connected to $\overline{Qc}$; and Kc is connected to $\overline{Qd}$, whereby the output of the NAND elements 60a, 60b, 60c, . . . , 60n are turned off from the output terminals $\overline{Qa}, \overline{Qb}, \overline{Qc}, . . . , \overline{Qn}$. It should be apparent that a person of ordinary skill in the art can easily design many circuit structures for combining the sequential turn-on and the sequential turn-off as set forth above.

Figure 10:
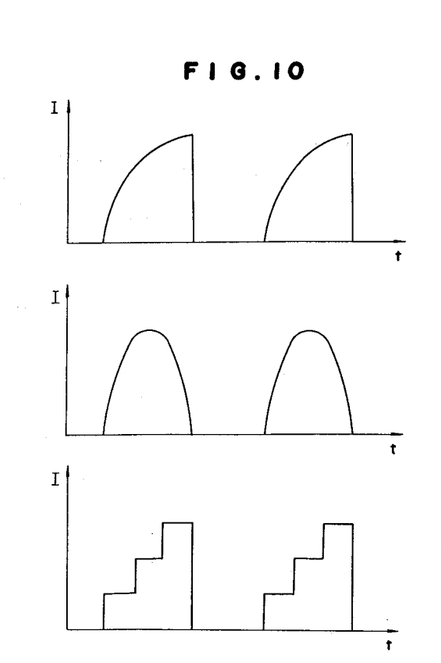
FIG. 10 shows waveforms of pulses applied across the working gap according to the present invention.

Moreover, it should be understood that the condition of the program is selected by setting desirable positions of the insert pin 63 of the program board 61 whereby the time intervals $t1, t2, . . . , t_{n-1}$ of FIG. 4 can be easily changed. The current peak value can be also changed by selecting a number of the transistors to be turned on at the same time. The figure of the insert pins on the program board shows the discharge current pulse waveform, and also pulse waveform conditions of the pulse width and the quiescent width, and the like. It is possible to use a switching circuit including various switches and semiconductors instead of the circuit 64 for changing the program condition for setting the waveform which includes the program board 61 and the insert pin 63 of FIG. 8. In accordance with the invention, it is possible to form various special waveforms, such as a triangular waveform, a trapezoid waveform, and certain approximate step types of waveforms as shown in FIG. 10, e.g. an n functional waveform, a sine waveform, step waveforms and the like. The lift-up and the lift-down of the triangular waveform and trapezoid waveform can be changed in a broad range. The operation for change of the waveform is quite easy whereby the waveform can be changed during an operation of the electrical discharge shaping. No reactor is inserted in the circuit, and accordingly, no spark voltage is caused and a chance for a break of the transistors is small. The switching transistor 27 and the collector resistor 29 for applying the voltage across the working gap shown in FIG. 6 can be substituted with one or a plurality of the other switching transistors 1a, 1b, 1c, . . . , 1n and 4a, 4b, 4c, . . . , 4n. When the collector resistor 29 of FIG. 6 is quite high, it is unnecessary to break the switching transistor 27 by the signal S2 at the time of detecting the initiation of the discharge. It should be understood that the pulse current having a special waveform in the above described embodiments, includes a pulse line combined with a rectangular waveform and the special waveform having a slant line. As stated above in detail, in accordance with the present invention, the pulse having the special waveform such as a triangular waveform can be formed in an ideal shape, whereby an improvement of the processing characteristics can be easily and readily accomplished and consumption of the electrode can be advantageously minimized. When the pulse current having a special waveform is passed across the working gap in accordance with the present invention, the lift-up time of the waveform is quite important for enabling a decrease of the consumption of the electrode.

Figure 11:
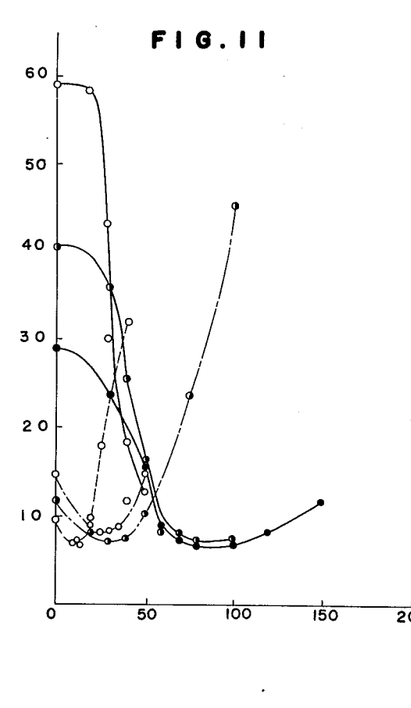
FIG. 11 is a characteristic graph showing relations between a lift-up of current waveform and an electrode consumption ratio in an electrical discharge shaping of a super hard alloy.

Another preferred embodiment of the present invention is to change the lift-up time depending upon a relation of the peak value of the pulse current across the working gap, whereby the electrode consumption ratio is decreased and the processing characteristics are improved. FIG. 11 shows the relation of the lift-up time of the current waveform and the electrode consumption ratio. The full line shows the case wherein the current peak value is 90 A. The chain line shows the case wherein the current peak value is 36 A. The broken line shows the case wherein the current peak value is 19 A. When the lift-up time is zero, the rectangular waveform which is used in the conventional electrical discharge shaping is provided. It is understood, from FIG. 11, that the electrode consumption ratio can be remarkably decreased, in comparison with the conventional process using rectangular waveform pulse, by controlling the lift-up time of the pulse current to be a desirable relation to the peak value of the pulse current. The desirable relation is the lift-up time of about 0.5 -1 $\mu$sec. to the peak value of 1 A for shaping a workpiece made of cemented carbide by electrical discharge, whereby the electrode consumption ratio can be minimized. When the electrical discharge shaping is performed by using the pulse current having the special waveform wherein the lift-up time is controlled by a desirable relation to the peak value of the pulse current, the electrode consumption ratio can be advantageously decreased to about 7 -8% in the range from a high energy of 1 pulse for a rough shaping to low energy of 1 pulse for a fine shaping. In the above description, the lift-up of the waveform is linearly controlled.

Figure 12:
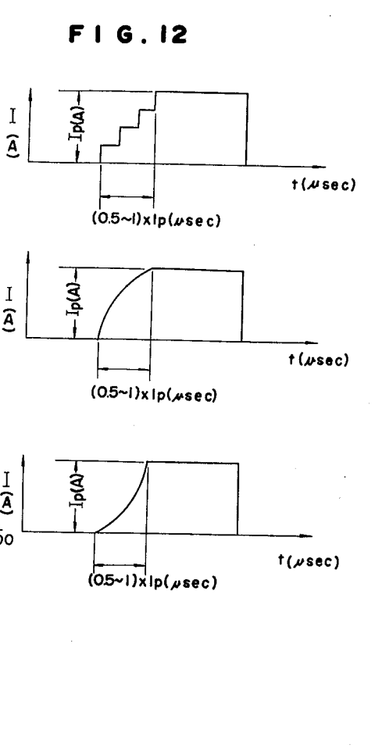
FIGS. 12a, 12b, 12c are graphs showing relations between a peak value of a current waveform and a lift-up time in the present invention.

It is clear that a similar effect can be expected by controlling the lift-up time of 0.5 -1 $\mu$sec. to the peak value of 1 A from the viewpoint of FIG. 12. In the above description, the electrode is made of copper and the workpiece is made of cemented carbide. The relation between the peak value of the pulse current and the lift-up time, should be different depending upon the raw material. In accordance with the present invention, the electrode consumption can be decreased by electrical discharge shaping a workpiece by passing a pulse current having the special waveform having a slant line (different from rectangular waveform) and which is formed by using transistors and switching elements.

Figure 13A:
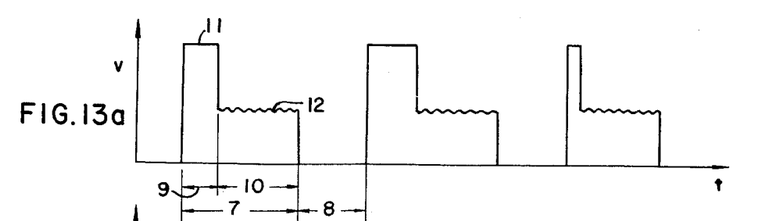
FIGS. 13a, 13b are an electrode voltage waveform and a current waveform applied in one preferred embodiment of the present invention.
Figure 13B:
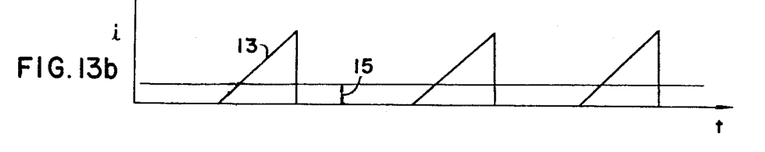

FIGS. 13a and 13b show a voltage waveform applied across the working gap by the apparatus of FIG. 6 and a current waveform. In FIGS. 13a and 13b, the reference numeral 7 designates a pulse voltage time interval; 8 designates a quiescent time; 9 designates a non-load voltage time interval; 10 designates a discharge time; 11 designates a non-load voltage; 12 designates a discharge voltage; 13 designates a discharge current; and 14 designates mean processing current. The features of FIGS. 13a and 13b are the same as the features of FIGS. 2a and 2b of the conventional process except that the current waveform is a triangular waveform instead of a rectangular waveform. When the processing is performed in a stable condition, the non-lead voltage 11 appears in high probability, whereby the mean non-load voltage time interval 9 is controlled to a certain time, because it is controlled by a servo mechanism so as to be a constant means processing voltage. However, even in the process of the present invention, the state of the working gap could be deteriorated due to a deposit of powder in the working gap, the non-load voltage time interval diminishes or even vanishes, and the discharge will be concentrated at a specific point and thus will produce a hollow portion. To correct this, in accordance with the present invention, when the non-load voltage time interval diminishes by the deterioration of the state of the working gap, a small discharge is initiated from an initiation of the discharge whereby the time interval from the initiation of the discharge to the high discharge is controlled, and the mean processing current is controlled. Accordingly, a quick response is given and even though the state of the working gap is deteriorated, the state is quickly recovered to provide a stable processing.

Figure 14A:
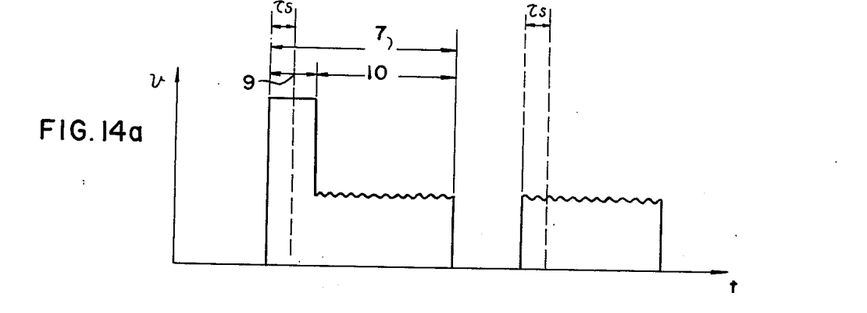
FIGS. 14a, 14b are graphs showing the principle of operation of another preferred embodiment of the present invention.
Figure 14B:
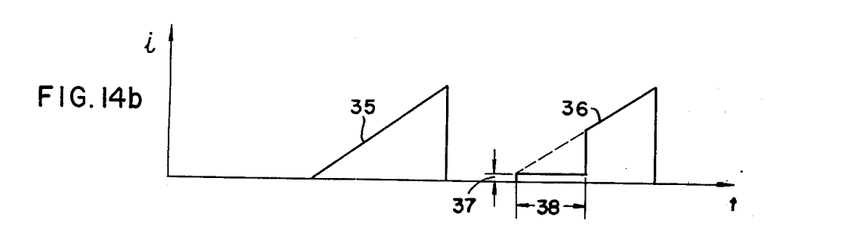

FIGS. 14a and 14b show a principle of one embodiment of the present invention. FIG. 14a is an electrode voltage waveform. A specific time $\tau s$ is set. When the non-load voltage time interval 9 is longer that $\tau s$, it is processed by the pulse current set as shown in 35. However, when the non-load voltage time interval 9 is shorter than $\tau s$, a small discharge current 37 is passed as shown in 36, and the small discharge period 38 is changed depending upon the non-lead voltage time interval 9 whereby the mean processing current is decreased.

Figures 15A, 15B:
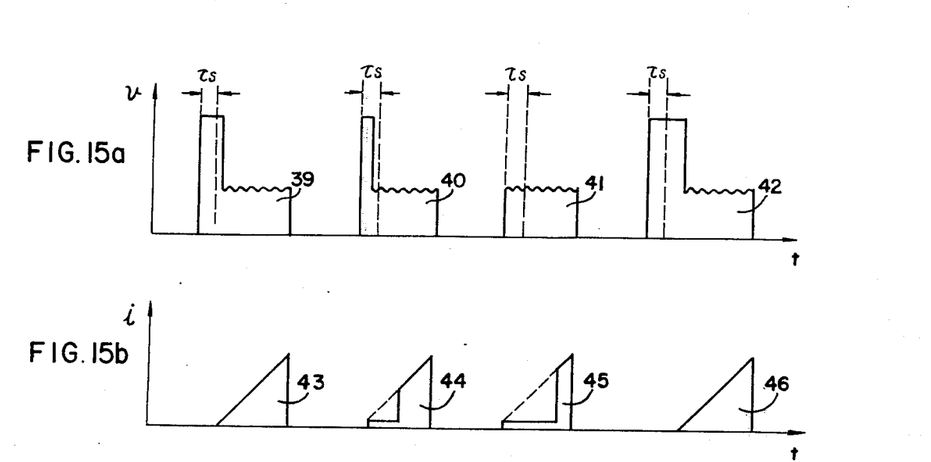
FIGS. 15a, 15b are an electrode voltage waveform and a current waveform applied in still another preferred embodiment of the present invention.

FIG. 15a shows an electrode voltage waveform in a practical processing and FIG. 15b shows a current waveform thereof. In the electrode voltage waveforms 39 and 42, the non-lead voltage time interval is longer than τs, whereby the processing is performed by a large current from the initiation of the discharge. In the electrode voltage waveforms 40 and 41, the non-load voltage time interval is shorter than τs, whereby a small discharge is given from the initiation of the discharge and the processing is performed by a large current only after a certain time.

Figure 16:
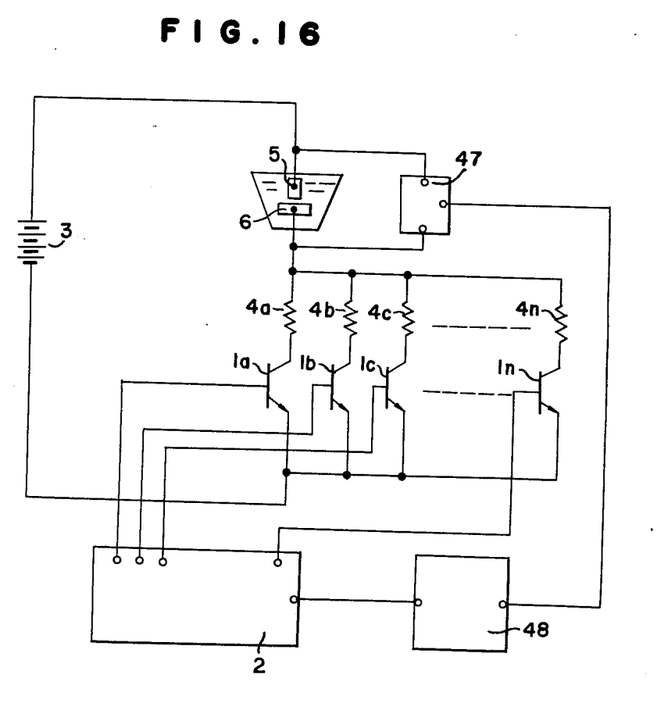
FIG. 16 is a schematic diagram of another preferred embodiment of an apparatus for shaping a workpiece by electrical discharges according to the present invention.

FIG. 16 is a schematic diagram of a further preferred embodiment implementing the above principle wherein the reference numeral 47 designates a detector for detecting a state of the working gap and 48 designates a reference circuit. The non-lead voltage time interval is measured by the detector 47. The non-load voltage time intervals are compared with a predetermined time τs by the reference circuit 48. When the non-load voltage time interval is shorter than τ s, a signal for turning on one or more of the switching transistors 1a, 1b, 1c, ..., 1n, is passed to the control circuit 2. On the other hand, from the time of initiation of the discharge, a device for forming the special waveform pulse in the control circuit 2 is activated, however, this signal is not passed to the base of the transistors. After a certain delay time, depending upon the non-load voltage time interval, a signal for turning off the gate of the transistors and the part for forming the special waveform pulse in the control circuit which is actuated from the time of initiation of discharge, is passed from the reference circuit 48 to the control circuit 2. The signal transmitted from the control circuit 2 is passed to the bases of the switching transistors 1a, 1b, 1c, ..., 1n so as to turn on the switching transistors. Accordingly, the pulse current is passed from the DC power source 3 through the switching transistors 1a, 1b, 1c, ..., 1n and the collector resistors 4a, 4b, 4c, ..., 4n across the working gap between the electrode 5 and the workpiece 6. In the above embodiments, a triangular waveform having a peak at a middle part has been described, however, it is also possible to apply a pulse current having a triangular waveform which peaks at a different location such as the front part thereof.

It should now be apparent that in accordance with the present invention, it is possible to perform an optimum processing by changing the mean processing current by providing a small discharge from the time of an initiation of the discharge and having a large current passed only after a certain time interval upon the state of the working gap. As a process for changing the mean processing current depending upon the state of the working gap, the invention includes the embodiment shown in FIGS. 17a and 17b and 18 as well as the embodiments of FIGS. 15a and 15b and 16.

With the present invention, when the state of the working gap has deteriorated so as to substantially vanish the non-load voltage time interval, then the lift-up and/or lift-down of the waveform of the pulse current is controlled to an easier grade for each pulse depending upon the non-lead voltage time interval, whereby the mean processing current is controlled. Accordingly, the response is quick and even if the state of the working gap is deteriorated, it is soon rocovered to perform a stable processing. When the lift-up of the waveform of the pulse current is an easier grade, it is possible to decrease the consumption of the electrode as shown in FIGS. 11 and 12. This is also quite advantageous.

Figure 17A:
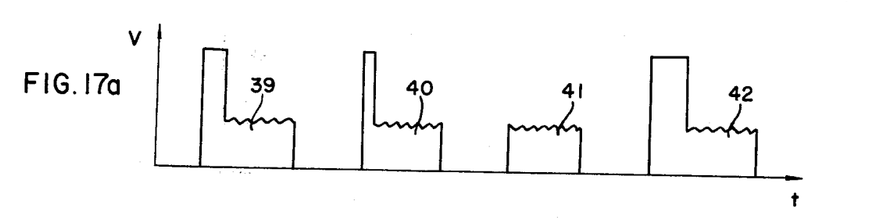
FIGS. 17a, 17b are an electrode voltage waveform and a current waveform applied in the embodiment of the invention of FIG. 16.
Figure 17B:
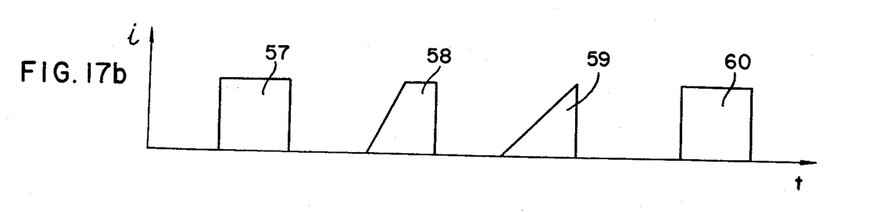

FIG. 17a shows an electrode voltage waveform in a practical processing. FIG. 17b shows a current waveform thereof. In the FIGS. 17a and 17b, the reference numerals 39, 42 are respectively electrode voltage waveforms in a stable processing state; and 57, 60 are respectively the current waveforms thereof. In comparison with the waveforms 39, 40, the waveform 40 is the voltage waveform which appears when the non-load voltage time interval is slightly longer and the state of the working gap is slightly deteriorated. The waveform 41 is a voltage waveform which appears when no non-lead voltage time interval is given and the state of the working gap is unstable. When the state of the working gap is stable as in the waveforms 39, 42, the workpiece gap is shaped by the pulse current having the rectangular waveforms 57, 60 as usual. However, when the non-load voltage time interval is shorter than the predetermined time, the lift-up of the pulse current is changed as shown in the waveforms 58, 59 depending upon the non-load voltage time interval. When the state of the working gap is unstable, the mean processing current can be quickly decreased so as to restore the working gap to a stable state.

Figure 18:
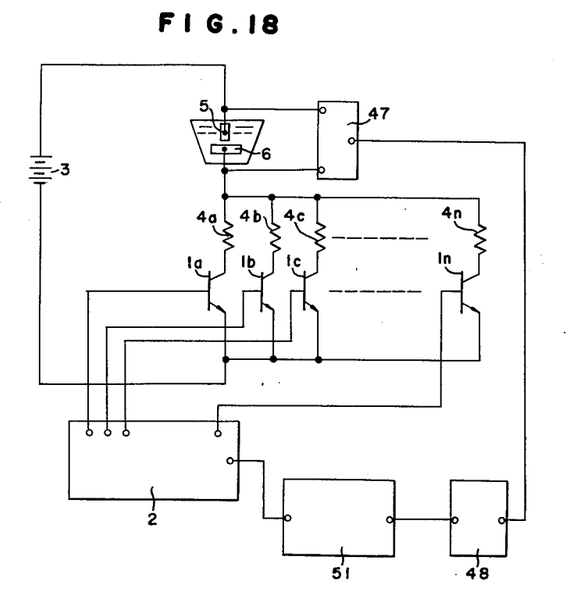
FIG. 18 is a schematic diagram of still another preferred embodiment of an apparatus for electrical discharge shaping a workpiece by applying the waveforms of FIG. 17.
Figure 19:
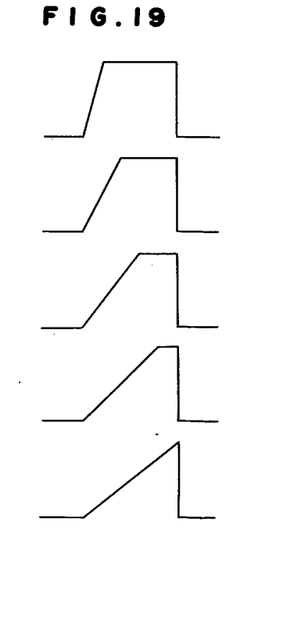
FIG. 19 shows variuos waveforms which are recorded in a memorizer used in the apparatus of FIG. 18.

FIG. 18 is a schematic diagram for implementing the principle of FIGS. 17a and 17b, wherein the reference numeral 47 designates a detector for detecting a state of the working gap; 48 designates a reference circuit; 51 designates a memorizing device for memorizing various pulse current waveforms which have various different lift-up times. The non-load voltage time interval is detected by the detector for detecting the state of the working gap 47. A desirable waveform is selected by the reference circuit 48 from the memorizing device for memorizing various pulse current waveforms, depending upon the non-load voltage time interval. The information of the selected waveform is passed to the control circuit 2. The signal transmitted from the control circuit 2 is passed to the base of the switching transistors 1a, 1b, 1c, ..., 1n and the switching transistors 1a, 1b, 1c, ..., 1n are sequentially turned on, whereby the pulse current having the desired specific waveform is passed from the DC power source 3 through the switching transistors 1a, 1b, 1c, ..., 1n and the collector resistors 4a, 4b, 4c, ..., 4n across the working gap between the electrode 5 and the workpiece 6. In the memorizing device for memorizing the waveforms 51, each of the turn-on times of the switching transistors 1a, 1b, 1c, ..., 1n are recorded. In the means for memorizing the waveform 51, it is possible to record various waveforms, such as shown in FIG. 19, and to select the waveform of the pulse currents as desired by manual operation. In the above embodiment, the waveform of the pulse current is changed under the condition of a constant current peak value, however, it should be understood that it is possible to change the current peak value.

Figure 20:
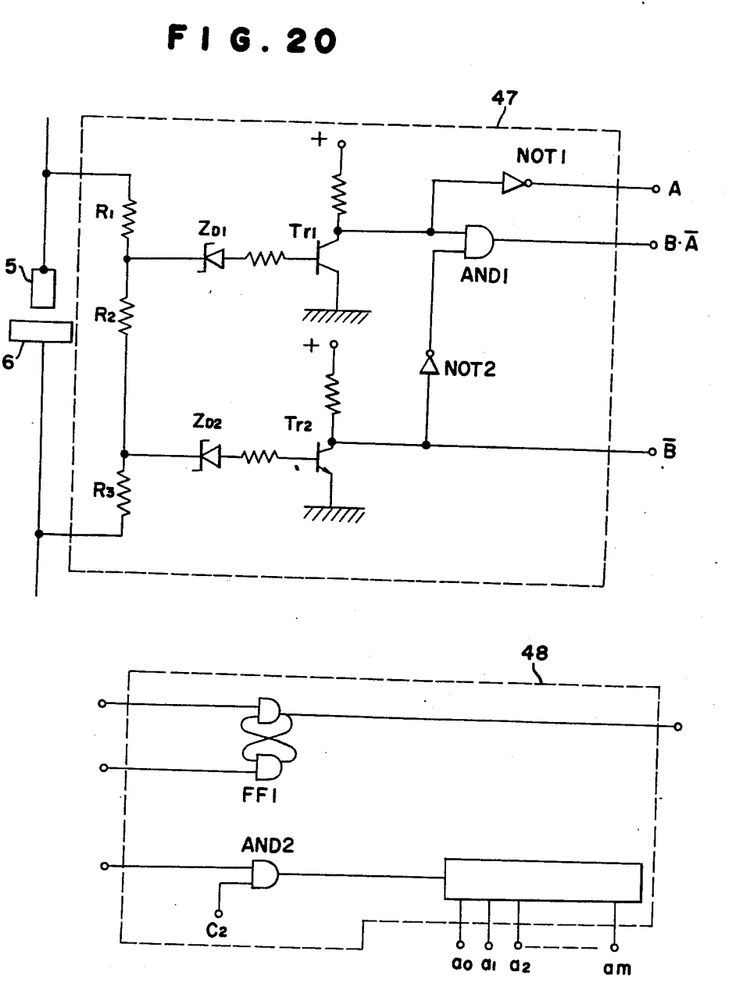
FIG. 20 is a circuit of one embodiment of the means for detecting a state of the working gap and the reference circuit suitable for use in FIGS. 16 and 18.
Figure 91:
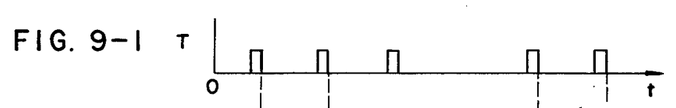
Figure 92:
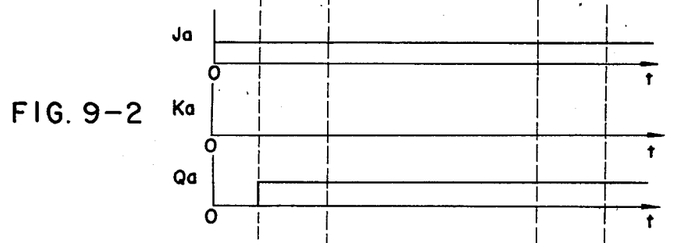
Figure 93:
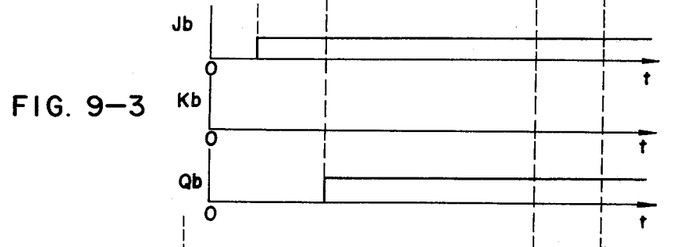
Figure 94:
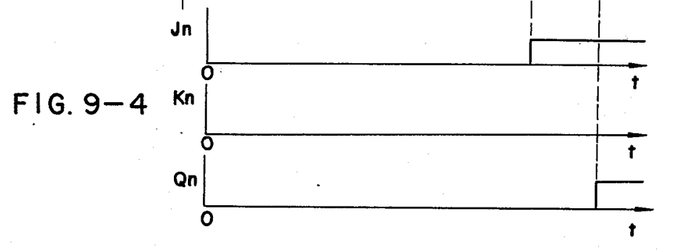

FIG. 20 shows one embodiment of the detector for detecting the state of the working gap 47 and the reference circuit 48 shown in FIGS. 16 and 18.

Referring now to FIG. 20, it is seen that in the detector for detecting the state of the working gap 47, the voltages at the connecting points of resistors R1, R2, R3 which are connected in series between the electrode 5 and the workpiece 6 are applied through zener diodes ZD1, ZD2 to the base of transistors Tr1, Tr2. The collector of the transistor Tr1 is connected to the input of a NOT circuit NOT1 and an AND circuit AND1. The collector of the transistor Tr2 is connected to the other input of the AND circuit AND1 through a NOT circuit NOT2. The reference circuit 48 consists of a flip-flop FF1, an AND circuit AND2 and a binary counter which is actuated by the AND circuit. The flip-flop FF1 actuates the clockpulse circuit (the circuit 31 of FIG. 6 or the clockpulse CP of FIG. 8) by an input of the signal at the discharge detecting terminal $\overline{BA}$ of the detector for detecting the state of the working gap and at the quiescent time detecting terminal $\overline{B}$. The AND circuit AND2 is to provide a logical AND of the signal at the non-load voltage detecting terminal A and the signal at the input terminal of the clockpulse circuit when a frequency is changed depending upon the predetermined time $\tau s$.

The circuit shown in FIG. 20 is further illustrated in the case of the structure of FIG. 16 and the control method of FIGS. 15a and 15b. When the non-load voltage is applied across the working gap, the signal A is 1 and the gate of the AND circuit AND2 is opened to apply the clockpulse C2 to the binary counter. In the binary counter it should be understood that position am becomes 1 by applying 1 pulse, $a_{m-1}$ and $am$ becomes 1 by by applying 2 pulses and $a1, a2, \ldots, am$ becomes 1 by applying $m$ pulses. When the non-load voltage time interval is longer than the predetermined time $\tau s$ such as 39 of FIGS. 15a and 15b, the output of 1 is provided from the terminal of the counter, whereby all of the gates $62a, 62b, \ldots, 62n$ of the control circuit 2 of FIG. 8 are opened. Accordingly, the signal $\overline{BA}$ is 1 by the initiation of the discharge, and the signal is passed through the flip-flop FF1, to actuate the clockpulse circuit, whereby the outputs of the J-K flip-flops $70a, 70b, \ldots, 70n$ are sequentially 1. This signal is passed through the opened gate $62a, 62b, \ldots, 62n$ to turn on each of the transistors so as to pass the current having the waveform 43. On the other hand, when the non-load voltage time interval is shorter than the predetermined time $\tau s$ such as 40 of FIGS. 15a and 15b, then the discharge is caused before the opening of all of the gates $62a, 62b, \ldots, 62n$. Accordingly, the signal is passed only through the gates $62a, 62b$ opened by the output of the first JK flip-flop $70a, 70b$ to turn on some of the transistors so as to pass the discharge current having the waveform 44 of FIGS. 15a and 15b. In the case of the structure of FIG. 18 and the control method of FIGS. 17a and 17b, the output of the binary counter of the reference circuit 48 of FIG. 20 is applied to the memorizing device 51 for memorizing the waveforms whereby a desirable memory of the waveform is selected from the memorial elements. The detector of the state of the working gap 47 can be used as the detector of the initiation of discharge 30 of FIG. 6.

Obviously, many modifications and variations of this invention are possible in light of these teachings. It is to be understood, therefore, that within the scope of the appended claims this invention may be practiced otherwise than as specifically described herein.

We claim:
1. A process for electrical discharge shaping a workpiece comprising:
applying a voltage between an electrode and a workpiece separated by a working gap to generate a discharge pulse current waveform therebetween,
generating across the working gap a discharge pulse current having a first waveform when the time interval from application of the pulse voltage across the working gap to initiation of discharge is no longer than a predetermined interval,
generating across the working gap a sloped discharge pulse current waveform different from the first waveform when the time interval from application of the pulse voltage across the working gap to initiation of discharge is shorter than the predetermined interval,
sequentially switching a plurality of semiconductor elements in the discharge circuit to generate across the working gap the first waveform and the sloped discharge pulse current waveform different from the first waveform.

2. The process for electrical discharge shaping a workpiece according to claim 1 further comprising generating a pulse current which is delayed a predetermined time from the initiation of discharge across the working gap and generating a small discharge current which does not contribute to the electrical discharge shaping during the time interval from the application of voltage across the working gap to the initiation of discharge.

3. A process in accordance with claim 1 wherein the sequential switching is controlled by retrieving from a storage device one of a plurality of current waveforms stored therein.

4. The process for electrical discharge shaping a workpiece according to claim 3 wherein the mean processing current of the particular current waveform selected varies directly as the length of time interval from the application of a pulse voltage across the working gap to the initiation of discharge.

5. A process for electrical discharge shaping a workpiece comprising:
applying a voltage between an electrode and a workpiece separated by a working gap to generate a discharge pulse current waveform therebetween,
generating across the working gap a discharge pulse current having a first waveform when the peak value of the discharge pulse current waveform is greater than a predetermined amount,
generating across the working gap a sloped discharge pulse current waveform different from the first waveform when the peak value of the discharge pulse current waveform is less than the predetermined amount,
sequentially switching a plurality of semiconductor elements in the discharge circuit to generate across the working gap the first waveform and the sloped discharge pulse current waveform different from the first waveform.

6. The process for electrical discharge shaping a workpiece according to claim 5 further comprising controlling the sloped discharge current waveform to substantially the range of $0.5 - 1.0$ $\mu$ sec. per 1 amp. of the peak value of the current.

7. An apparatus for electrical discharge shaping a workpiece comprising:
a workpiece;
an electrode positioned opposite the workpiece to form a working gap therebetween;
means for applying voltage across the working gap to generate a discharge pulse current waveform across the working gap;
a plurality of semiconductor switching elements for controlling the voltage applied across the working gap to control the discharge pulse current waveform across the working gap; and
control means for sequentially controlling the semiconductor switching elements to vary the current across the working gap to generate across the working gap a discharge pulse current having a first waveform when the time interval from application of the pulse voltage across the working gap to initiation of the discharge is longer than a predetermined interval and to generate across the working gap a sloped discharge pulse current waveform different from the first waveform when the time interval from application of the pulse voltage across the working gap to initiation of discharge is shorter than the predetermined interval.

* * * * *